US011500877B2

(12) United States Patent
Konik et al.

(10) Patent No.: US 11,500,877 B2
(45) Date of Patent: Nov. 15, 2022

(54) STREAMING TUPLE DATABASE CONTROL

(71) Applicant: International Business Machines Corporation, Armonk, NY (US)

(72) Inventors: Rafal Konik, Oronoco, MN (US); Jingdong Sun, Rochester, MN (US); Roger Mittelstadt, Byron, MN (US); Jessica R. Eidem, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 296 days.

(21) Appl. No.: 16/702,235

(22) Filed: Dec. 3, 2019

(65) Prior Publication Data

US 2021/0165796 A1 Jun. 3, 2021

(51) Int. Cl.
*G06F 16/00* (2019.01)
*G06F 16/2455* (2019.01)
*G06F 16/25* (2019.01)
*G06F 16/2453* (2019.01)
*G06F 16/22* (2019.01)

(52) U.S. Cl.
CPC .... *G06F 16/24568* (2019.01); *G06F 16/2282* (2019.01); *G06F 16/24542* (2019.01); *G06F 16/252* (2019.01)

(58) Field of Classification Search
CPC ........... G06F 16/24568; G06F 16/2282; G06F 16/24542; G06F 16/252
USPC ........................................................ 707/696
See application file for complete search history.

(56) References Cited

U.S. PATENT DOCUMENTS

| 6,604,102 B2 | 8/2003 | Klein et al. |
| 9,256,640 B2 | 2/2016 | Branson et al. |
| 9,679,016 B1 | 6/2017 | Kekre et al. |
| 2018/0020045 A1* | 1/2018 | Cook ........................ G06F 8/30 |
| 2018/0121448 A1* | 5/2018 | Barsness ........... G06F 16/24568 |

OTHER PUBLICATIONS

Maskey et al., Replay-Based Approaches to Revision Processing in Stream Query Engines, Proceedings of the 2nd international workshop on Scalable stream processing system (SSPS '08). ACM, New York, NY, USA, 3-12, 2019.
Jain et al., Towards a Streaming SQL Standard, Proc. VLDB Endow. 1, 2 (Aug. 2008), 1379-1390, 2019.

(Continued)

*Primary Examiner* — Chelcie L Daye
(74) *Attorney, Agent, or Firm* — Garg Law Firm, PLLC; Rakesh Garg; Nathan Rau

(57) ABSTRACT

In an embodiment, a method for controlling a database in a streaming application includes receiving, by a compute node, data for transmission as streaming data on a network connected to the compute node and a database. The compute node then assembles a body portion of a tuple to include the data and assembles a header portion of the tuple to include a database statement that identifies a change to be made by the database to an aspect of the database in a format that is identifiable by the database. The compute node then transmits the tuple having the header portion thereof and the body portion thereof on the network as streaming data with the header and body portions of the tuple being directed to the database.

19 Claims, 8 Drawing Sheets

(56) References Cited

OTHER PUBLICATIONS

Ji et al., Quality-Driven Continuous Query Execution over Out-of-Order Data Streams, Proceedings of the 2015 ACM Sigmod International Conference on Management of Data (SIGMOD '15). ACM, New York, NY, USA, 889-894, 2019, https://dl.acm.org/citation.cfm?doid=2723372.2735371.

* cited by examiner

STREAMING TUPLE DATABASE CONTROL

TECHNICAL FIELD

The present invention relates generally to a method, system, and computer program product for database management. More particularly, the present invention relates to a method, system, and computer program product for streaming tuple database control.

BACKGROUND

Database systems are typically configured to separate the process of storing data from accessing, manipulating, or using data stored in a database. In traditional, static database systems, data is first stored and indexed in memory before subsequent querying and analysis. In general, such static database systems are not always well-suited for performing real-time processing and analyzing streaming data. For example, static database systems are sometimes unable to store, index, and analyze large amounts of streaming data efficiently or in real time.

Stream-based computing and stream-based database computing have emerged in recent years as developing technologies for database systems. In a streaming application, nodes connected to one another across a network allow data to flow from one node to the next. Such data flows encapsulate blocks of data in a "tuple." A tuple is a block of data of one or a variety of different data types, such as integer, float, Boolean, or string data. Groups of tuples are transmitted in sequences referred to as a "stream" or "data stream." In particular, it may occur that data arrives essentially continuously, as a stream of data points corresponding to an ongoing or continuous event.

For example, data representing the price of a particular stock may generally fluctuate over the course of a day, and a data stream management system may continuously receive updated stock prices, e.g., at equal time intervals or as the price changes. Other examples of such data streams include temperature or other environmental data collected by sensors, computer network analytics, patient health data collected at a hospital, or data describing a manufacturing process or other business process(es).

SUMMARY

The illustrative embodiments provide for streaming tuple database control. An embodiment includes receiving, by a compute node, data for transmission as streaming data on a network connected to the compute node and a database. The embodiment further includes assembling, by the compute node, a body portion of a tuple to include the data and assembling, by the compute node, a header portion of the tuple to include a database statement that identifies a change to be made by the database to an aspect of the database in a format that is identifiable by the database. The embodiment further includes transmitting, by the compute node, the tuple having the header portion thereof and the body portion thereof on the network as streaming data with the header and body portions of the tuple being directed to the database.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
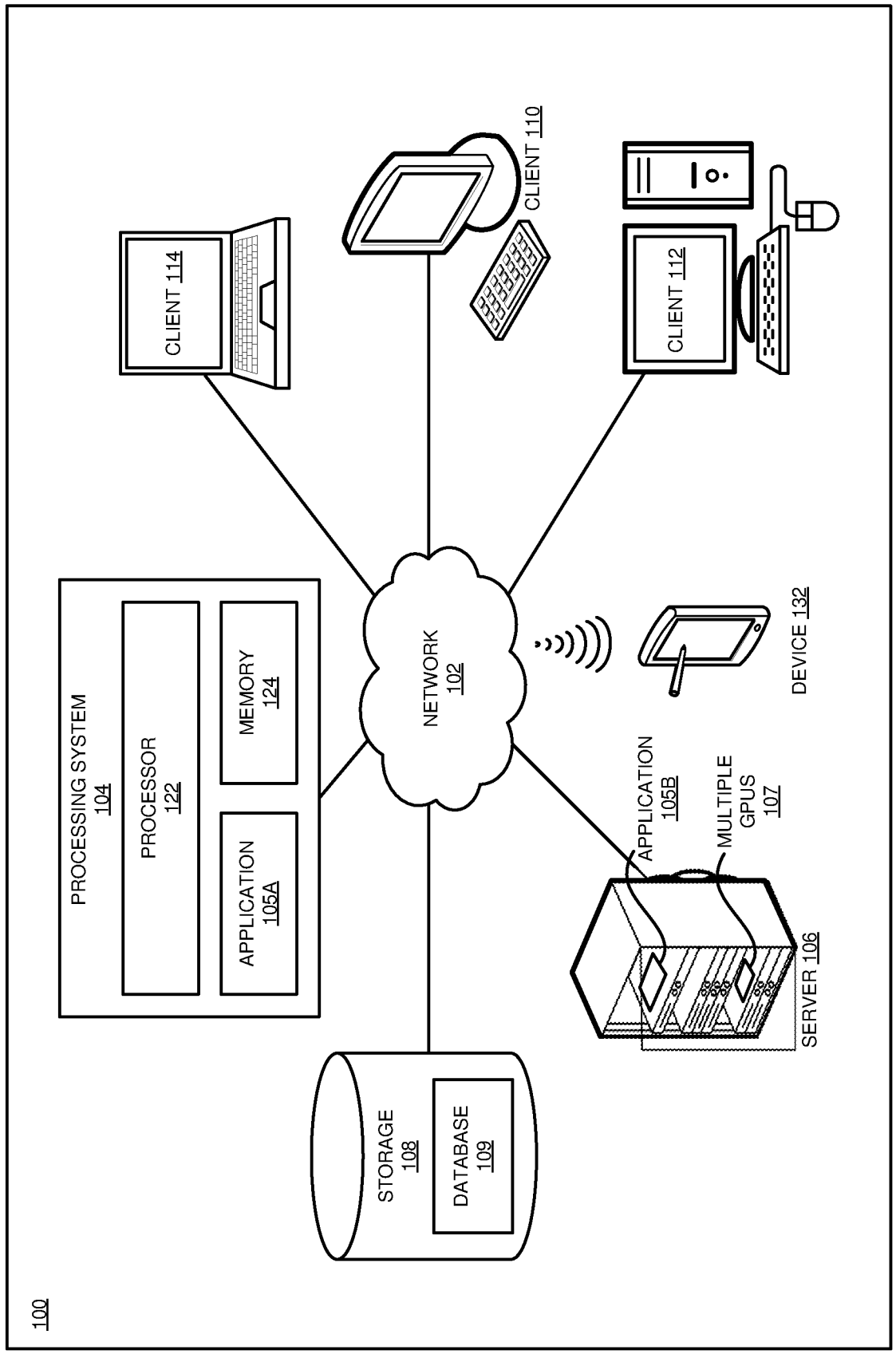
FIG. 1 depicts a block diagram of a network of data processing systems in which illustrative embodiments may be implemented.

Information accessible by software executed in an electronic computing and communication system is often stored in data storage units or logical constructs, such as databases. The use of a database includes the configuration and management of the database. For example, using a database typically includes modifying the database at various times to change one or more database structural elements (e.g., tables, columns, objects, or documents) defining how data is stored in the database. As one non-limiting example, a retailer using a database for product inventory may occasionally want to modify a database table or index to accommodate inventory data for new products being introduced or for existing products being discontinued.

Data-intensive applications are becoming common-place that use transient data streams instead of more traditional applications that modeled data as persistent relations. Examples of such data-intensive applications include financial applications, network monitoring, telecommunications data management, and sensor networks. In the data streaming model, individual data items continuously arrive in multiple, rapid, time-varying, and possibly unpredictable and unbounded streams, which yields fundamental problems when trying to make alterations to a database. In traditional databases and data management systems, data is stored in an essentially static form within one or more computer memories. That is, the data may generally be altered when desired, but at any given moment the stored data represents a discrete, static, finite, persistent data set against which, e.g., queries may be issued. Database alterations have previously been made using database statements or commands, such as SQL commands or optimization hints, that are communicated to the database separate and apart from the data streams via a user administration interface. However, such alterations typically require locking the database, which can be problematic at times due to the rapid and sometimes unpredictable nature of data streams arriving to the database through separate channels.

These database control issues can be solved by implementations of the present disclosure. The systems and methods of the present disclosure address problems particular to controlling a database in a streaming application by introducing systems and methods that include requested database modifications within the header or other portion of data tuples. The implementations of the present disclosure thus introduce new and efficient improvements in the ways in which databases can be modified and may serve to improve the speed and/or efficiency of one or more processor-based systems configured to support or utilize the database.

In an embodiment, a compute node creates or modifies a tuple to include instructions indicative of changes to be made to one or more structural elements of a database. In some such embodiments, the instructions are expressed using a database statement. The term "database statement," as used herein, refers to a database statement, instruction, optimization hint, or other database command that can be processed by a database, and can include, as non-limiting examples, instructions for creating, inserting, retrieving, selecting, querying, searching for, updating, or deleting data or data structures within a database, or in the case of optimization hints can include, as non-limiting examples, indications of modifications to an access plan. A database statement can be expressed, as non-limiting examples, in a data manipulation language (DML) or data description language (DDL), such as the structured query language (SQL).

In an embodiment, a non-limiting example of a database statement includes "CREATE TABLE tbl (col_ID INT, col_1 VARCHAR(255))" for creating a new table named "tbl" having an integer (INT) column "col_ID" and a variable character (VARCHAR) column "col_1." In an embodiment, another non-limiting example of a database statement includes "ALTER TABLE tbl ADD COLUMN (col_2 INT)" for adding an integer (INT) column "col_2" to table "tbl." In an embodiment, another non-limiting example of a database statement includes "ALTER TABLE tbl MODIFY col_2 BIGINT" for changing the data type of column "col_2" to big integer (BIGINT). In an embodiment, another non-limiting example of a database statement includes "ALTER TABLE tbl DROP COLUMN col_1" for deleting a column "col_1" from the table "tbl." In an embodiment, another non-limiting example of a database statement includes "DROP TABLE tbl" for removing a table "tbl."

In an embodiment, the statement includes a batch database statement including multiple database statements. In an embodiment, any routine that creates a new tuple copied from an existing tuple (parent tuple), the statement pair of the parent tuple are copied into a statement pair of the new tuple. In an embodiment, the statement pair includes only a database statement and omits the statement type indicator. In such embodiments, the database detects the presence of the database statement in the tuple by detecting the database statement rather than detecting the statement type indicator.

In an embodiment, a compute node receives data from a streaming application en route to a database across a network as streaming data and receives an instruction to forward to the database, where the instruction is for a change to an aspect of the database, such as an optimization hint for making an alteration to an access plan or an alter statement to alter the structure of the database. In an embodiment, the compute node assembles a header portion of the tuple that includes a database statement that identifies the change to be made to the database in a format that is identifiable by the database the data into a body portion of a tuple to include the data. In an embodiment, the compute node assembles a body portion of the tuple to include the received data. In an embodiment, the compute node transmits the tuple having the header and body portions on the network as streaming data directed to the database.

In an embodiment, the compute node receives the instruction for a change to an aspect of the database from a user, for example via a user interface and/or via one or more other compute nodes. In an embodiment, the compute node receives the instruction for a change to an aspect of the database from an application associated with the data. For example, in an embodiment, an application associated with the data receives an instruction from a database administrator to make a change to the database and the application forwards that instruction to the compute node. As another example, in an embodiment, the application automatically detects the need for a change to the database and forwards instructions for the change to the compute node.

In an embodiment, a compute node includes a processing element. The processing element receives data from a streaming application en route to a database across a network as streaming data and receives an instruction to forward to the database, where the instruction is for a change to an aspect of the database, such as an optimization hint for making an alteration to an access plan or an alter statement to alter the structure of the database. In an embodiment, the processing element assembles a header portion of the tuple that includes a database statement that identifies the change to be made to the database in a format that is identifiable by the database the data into a body portion of a tuple to include the data. In an embodiment, the processing element assembles a body portion of the tuple to include the received data. In an embodiment, the processing element transmits the tuple having the header and body portions on the network as streaming data directed to the database.

In an embodiment, the processing element receives the instruction for a change to an aspect of the database from a user, for example via a user interface and/or via one or more other processing elements. In an embodiment, the processing element receives the instruction for a change to an aspect of the database from an application associated with the data. For example, in an embodiment, an application associated with the data receives an instruction from a database administrator to make a change to the database and the application forwards that instruction to the processing element. As another example, in an embodiment, the application automatically detects the need for a change to the database and forwards instructions for the change to the processing element.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
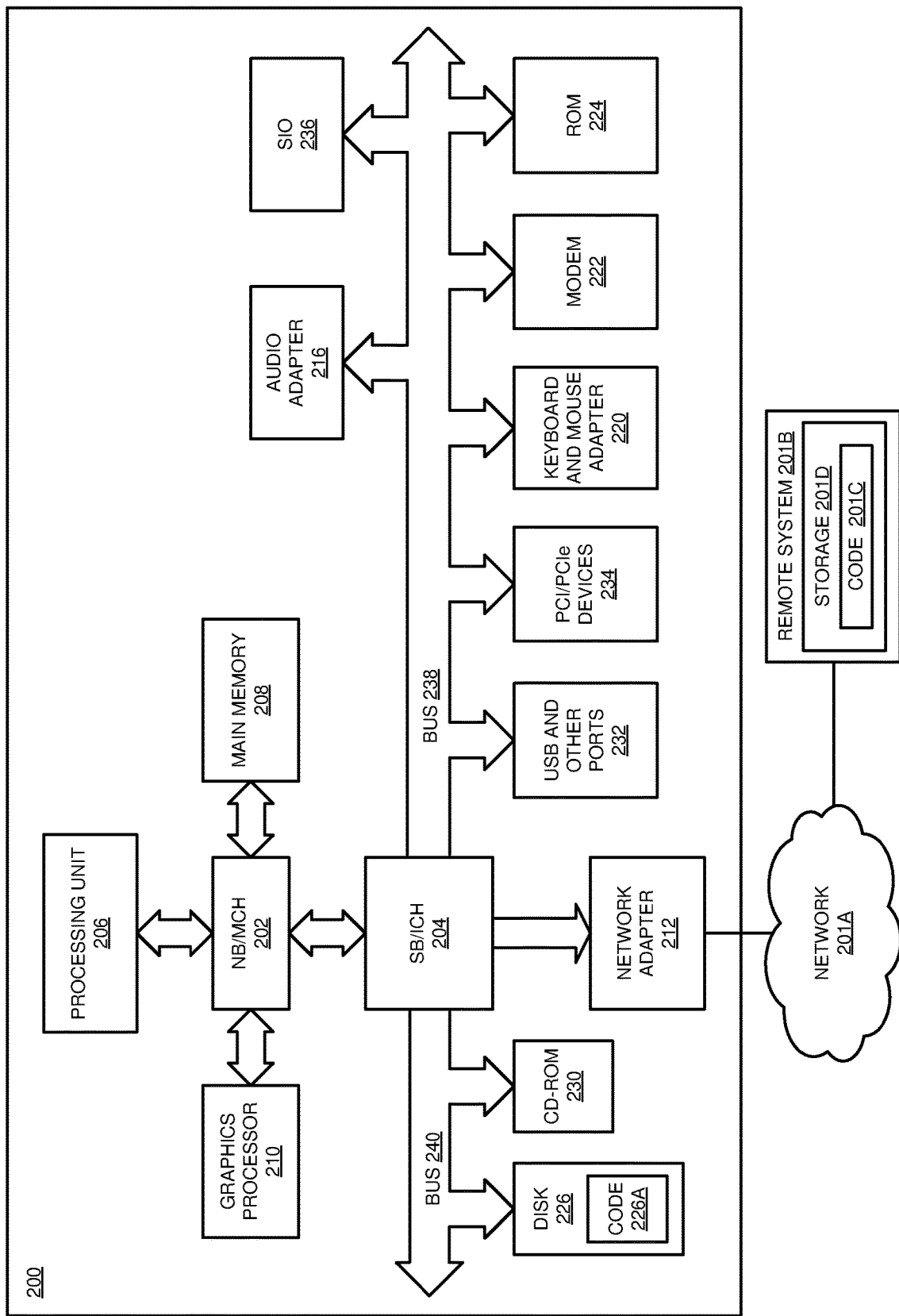
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes neural network application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by neural network application 105B such as initiating processes described herein of the neural network. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In an embodiment, one or more of neural network application 105A of data processing system 104 and neural network application 105B of server 106 implements an embodiment of a neural network, such as a DNN, as described herein. In a particular embodiment, the neural network is implemented using one of network application 105A and network application 105B within a single server or processing system. In another particular embodiment, the neural network is implemented using both network application 105A and network application 105B within a single server or processing system. Server 106 includes multiple GPUs 107 including multiple nodes in which each node may include one or more GPUs as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
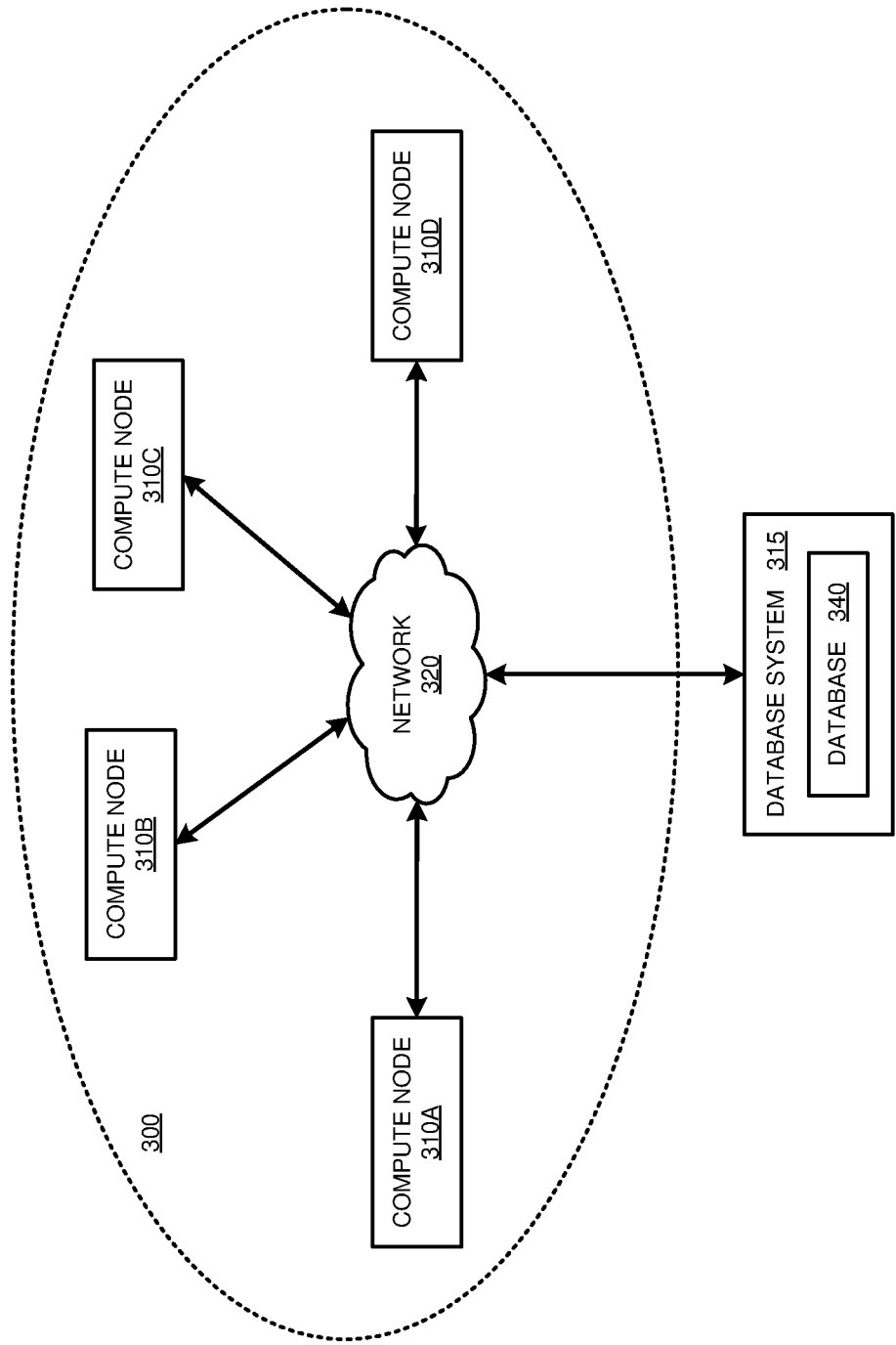
FIG. 3 depicts a block diagram of an example computing infrastructure in accordance with an illustrative embodiment.

With reference to FIG. 3, this figure depicts a block diagram of an example computing infrastructure 300 in accordance with an illustrative embodiment. In an embodiment, the computing infrastructure 300 is configured to execute a stream computing application, which is an example of application 105A/105B of FIG. 1.

In the illustrated embodiment, the computing infrastructure 300 includes a plurality of compute nodes 310A-310D (herein generically referred to as nodes 310)—i.e., hosts—which are communicatively coupled to each other using one or more communications networks 320. In an embodiment, the communications network 320 includes one or more servers, networks, or databases, and uses a communication protocol to transfer data among compute nodes 310. In an embodiment, a database system 315 containing a database 340 is communicatively coupled to network 320 for communication with compute nodes 310. In a particular embodiment, database system 315 is an example of server 106 with database 109 of FIG. 1, and nodes 310A-310D are examples of data processing system 104, clients 110, 112, and 114, and device 132 of FIG. 1.

In the illustrated embodiment, the one or more compute nodes 310A-310D each comprise code for creating or modifying a tuple to include instructions indicative of changes to be made to one or more structural elements of a database. In some such embodiments, a compute nodes 310A-310D expresses the instructions using a database statement. For example, in an embodiment, the database statement is based on a user input via a user interface directing a corresponding change to the database. As another example, in an embodiment, the database statement is generated by an application configured to automate aspects of detecting a need to modify the database and send instructions for such modification to a compute nodes 310A-310D to be embedded in a tuple. In an embodiment, a compute nodes 310A-310D creates or modifies a tuple to comprise a database statement that includes a statement, instruction, optimization hint, or other database command that can be processed by a database, and can include, as non-limiting examples, instructions for creating, inserting, retrieving, selecting, querying, searching for, updating, or deleting data or data structures within a database, or in the case of optimization hints can include, as non-limiting examples, indications of modifications to an access plan. In an embodiment, a compute nodes 310A-310D expresses a database statement in, as non-limiting examples, a data manipulation language (DML) or data description language (DDL), such as the structured query language (SQL).

Figure 4:
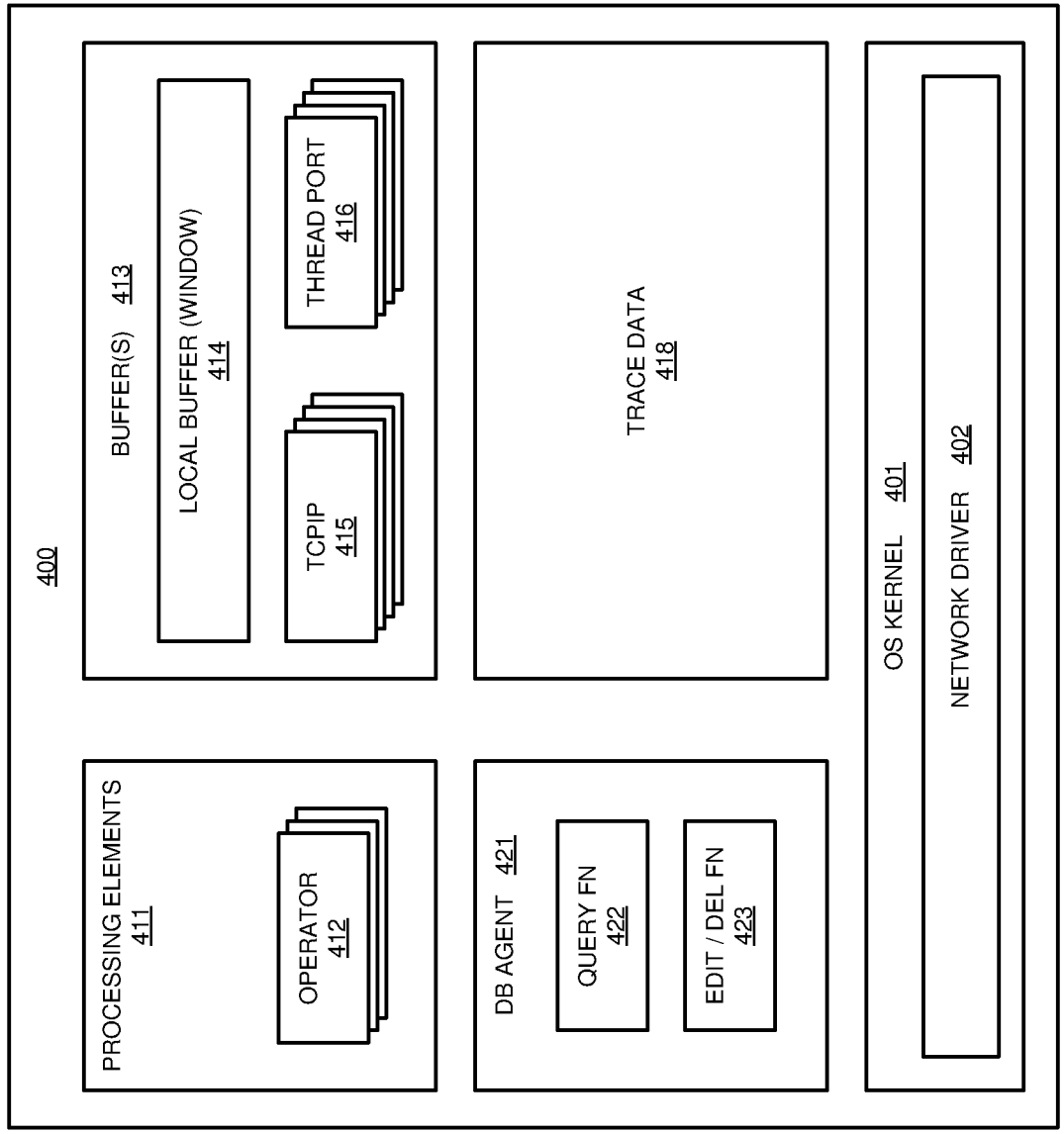
FIG. 4 depicts a block diagram of an example compute node in accordance with an illustrative embodiment.

With reference to FIG. 4, this figure depicts a block diagram of an example compute node 400 in accordance with an illustrative embodiment. In an embodiment, the node 400 is an example of nodes 310A-310D of FIG. 3. In an embodiment, the block diagram of node 400 is also an example of data processing system 104, clients 110, 112, and 114 and device 132 shown in FIG. 1, and can include any of the elements shown in FIG. 2. For example, in an embodiment, the node 400 is an example of data processing system 104, clients 110, 112, and 114 and device 132 shown in FIG. 1 and the block diagram of node 400 in FIG. 4 shows software components stored in one or more of main memory 208, ROM 224, hard disk drive or solid-state drive 226, and/or CD-ROM 230 shown in FIG. 2 and/or other similar local and/or remote computer usable storage devices.

In the illustrated embodiment, node 400 includes an operating system kernel 401, one or more processing elements 411, a buffer 413, and a compute node database agent 421. In an embodiment, operating system kernel 401 includes executable code and state data providing various low-level software functions, such as device interfaces, management of memory pages, management and dispatching of multiple tasks, and services for application programs. In an embodiment, operating system kernel 401 includes one or more network adapter drivers 402 for handling communications with one or more networks. In an embodiment, network adapter drivers 402 include instructions for communicating with network 320 shown in FIG. 3 via network adapter 212 shown in FIG. 2.

In the illustrated embodiment, the one or more processing elements 411 each comprise code and state data for performing respective functions as part of a data stream computing application. In an embodiment, a stream computing application includes one or more stream operators 412. In an embodiment, the node 400 includes two or more processing elements 411, each having one or more stream operators 412. In an embodiment, each stream operator 412 includes a portion of code that processes tuples flowing into a processing element 411 and outputs tuples to other stream operators 412 in the same processing element 411, in other processing elements 411, or in both the same and other processing elements 411 in a stream computing application.

In the illustrated embodiment, the one or more processing elements 411 each comprise code for creating or modifying a tuple to include instructions indicative of changes to be made to one or more structural elements of a database. In some such embodiments, a processing element 411 expresses the instructions using a database statement. For example, in an embodiment, the database statement is based on a user input via a user interface directing a corresponding change to the database. As another example, in an embodiment, the database statement is generated by an application or processing element 411 configured to automate aspects of detecting a need to modify the database and send instructions for such modification to a processing element 411 to be embedded in a tuple. In an embodiment, a processing element 411 creates or modifies a tuple to comprise a database statement that includes a statement, instruction, optimization hint, or other database command that can be processed by a database, and can include, as non-limiting examples, instructions for creating, inserting, retrieving, selecting, querying, searching for, updating, or deleting data or data structures within a database, or in the case of optimization hints can include, as non-limiting examples, indications of modifications to an access plan. In an embodiment, a processing element 411 expresses a database statement in, as non-limiting examples, a data manipulation language (DML) or data description language (DDL), such as the structured query language (SQL).

In an embodiment, processing elements 411 pass tuples to other processing elements 411 that are on the same compute node 400 or on other compute nodes 400 that are accessible via a communications network. For example, in an embodiment, the compute node 400 is an example of node 310A shown in FIG. 3, and node processing element 411 passes tuples to other processing elements 411 that are on the same compute node 310A or on one or more other compute nodes 310B-310D that are accessible via a communications network 320.

In the illustrated embodiment, the node 400 includes a buffer 413 that holds data being streamed as part of the stream computing application, including data tuples. In an embodiment, the buffer 413 includes a local buffer or "window" 414, one or more TCP/IP buffers 415, and one or more thread ports 416. In an embodiment, the one or more TCP/IP buffers 415 pass messages among various entities of the data streaming applications, and the one or more thread ports 416 queue data to be processed in one or more threads.

In the illustrated embodiment, the node 400 includes a compute node database agent 421 that includes executable code and state data that performs functions on behalf of a requesting entity with respect to data in the data streaming application and/or performs functions that enable a relational database to access streaming data. For example, in an embodiment, the management system 305 and/or database system 315 shown in FIG. 3 are examples of requesting entities. In an embodiment, the database agent 421 includes instructions for one or more of a variety of functions, which can include one or both of a query function 422 and/or an edit/delete function 423. For example, in an embodiment, the database agent 421 includes a query function 422 that executes queries on behalf of a requesting entity against data in buffer 413 and returns query results to the requesting entity. As another example, in an embodiment, the database agent 421 includes an edit/delete function 423 that performs edit and/or delete operations on data in the buffer 413 on behalf of a requesting entity.

Figure 5:
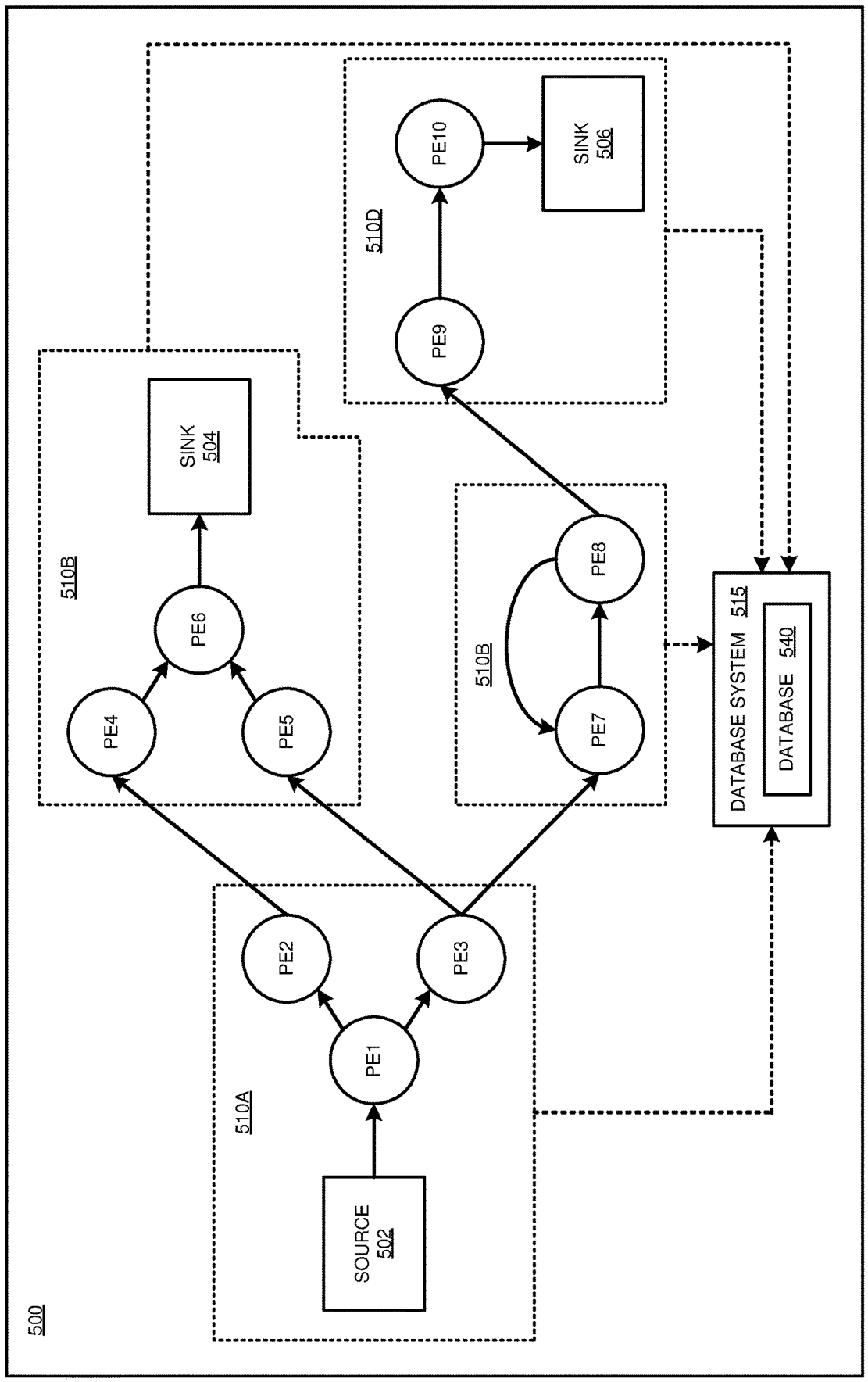
FIG. 5 depicts a block diagram of an example operator graph for a stream computing application in accordance with an illustrative embodiment.

With reference to FIG. 5, this figure depicts a block diagram of an example operator graph 500 for a stream computing application in accordance with an illustrative embodiment. The example embodiment includes an operator graph 500 for a stream computing application beginning from one or more sources 502 through connected processing elements PE1-PE10 to one or more sinks 504, 506 distributed among a plurality of nodes 510A-510D. In a particular embodiment, nodes 510A-510D are examples of nodes 310A-310D shown in FIG. 3, which are examples of clients 110, 112, and 114, and device 132 shown in FIG. 1.

In the illustrated embodiment, the flows from source 502 and/or from a processing element PE1-PE10 to sink 504, 506 and/or a processing element PE1-PE10 are examples of execution paths. In a particular embodiment, the operator graph 500 includes data flows between stream operators 412 shown in FIG. 4 within the same or different processing elements PE1-PE10. In an embodiment, a source 502 outputs tuples into the stream and serves as a node where a stream begins, processing elements PE1-PE10 receive tuples from the stream and output tuples into the stream, and a sink 504, 506 receives tuples from the stream and serves as a node where the stream terminates. In an embodiment, the operator graph 500 is more complex than the illustrated embodiment and included a plurality of individual operator graphs that are statically or dynamically linked together.

In the illustrated embodiment, the operator graph 500 begins at a source 502, ends at a sink 504, 506, and includes ten processing elements PE1-PE10 between the source 502 and sinks 504, 506, running on compute nodes 510A-510D. In an embodiment, tuples output by operator graph 500, whether from a source 502, one of processing elements PE1-PE10, or one of sinks 704, 706, will either continue on the operator graph 500 along a path between the source 502 to one of the sinks 504, 506, or will be directed to one or more tables of a structured relational database 540 of a database system 515. In a particular embodiment, database 540 is an example of database 340 shown in FIG. 3 and database system 515 is an example of database system 315 shown in FIG. 3.

In the illustrated embodiment, the one or more processing elements PE1-PE10 of compute nodes 510A-510D each comprise code for creating or modifying a tuple to include instructions indicative of changes to be made to one or more structural elements of a database. In some such embodiments, the processing elements PE1-PE10 express the instructions using a database statement. For example, in an embodiment, the database statement is based on a user input via a user interface directing a corresponding change to the database. As another example, in an embodiment, the database statement is generated by an application configured to automate aspects of detecting a need to modify the database and send instructions for such modification to any one of the processing elements PE1-PE10 to be embedded in a tuple. In an embodiment, the processing elements PE1-PE10 are configured to create or modify a tuple to comprise a database statement that includes a statement, instruction, optimization hint, or other database command that can be processed by a database, and can include, as non-limiting examples, instructions for creating, inserting, retrieving, selecting, querying, searching for, updating, or deleting data or data structures within a database, or in the case of optimization hints can include, as non-limiting examples, indications of modifications to an access plan. In an embodiment, the processing elements PE1-PE10 express a database statement in, as non-limiting examples, a data manipulation language (DML) or data description language (DDL), such as the structured query language (SQL).

Figure 6:
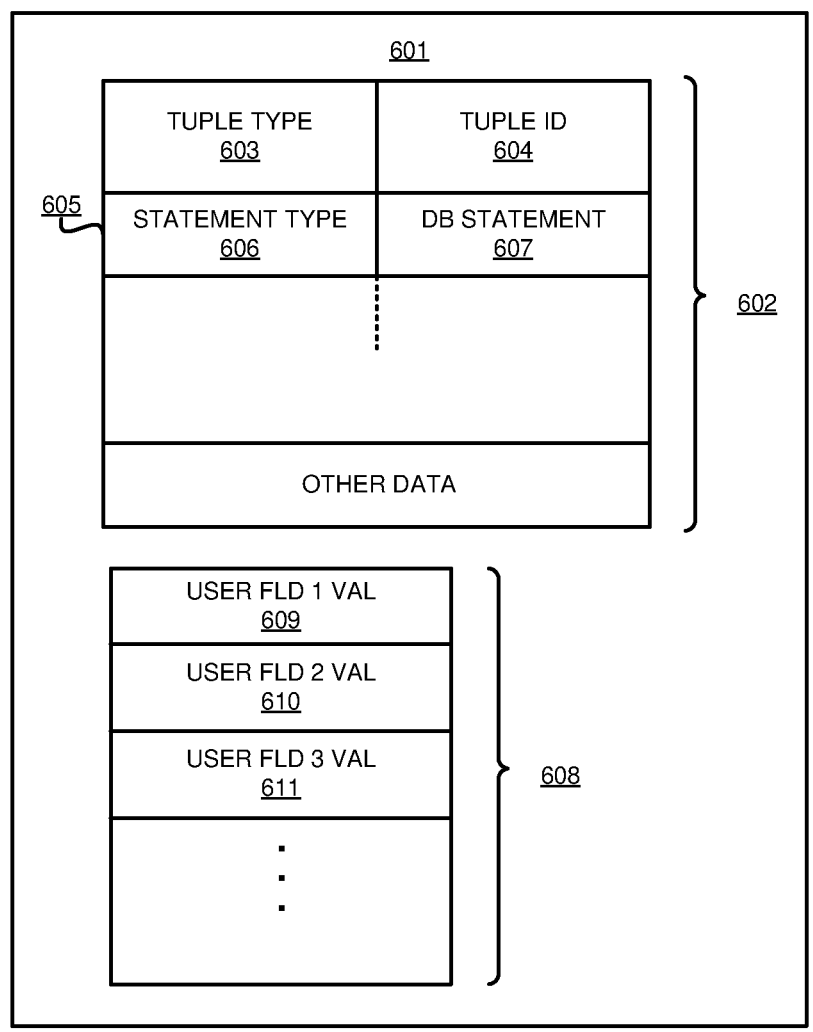
FIG. 6 depicts a block diagram of an example tuple in accordance with an illustrative embodiment.

With reference to FIG. 6, this figure depicts a block diagram of an example tuple 601 in accordance with an illustrative embodiment. The example embodiment shows a tuple 601 as created or modified by a compute node, such as compute nodes 310A-310D of FIG. 3, or created or modified by a processing element of a compute node, such as a processing element 411 of a compute node 400 of FIG. 4. The example embodiment of a tuple 601 includes a header 602 and a body portion 608. In a particular embodiment, the header 602 and/or body portion 608 of the tuple 601 is created or modified by application 105A/105B of FIG. 1.

In the illustrated embodiment, the tuple 601 includes a header 602 containing a tuple type 603, a unique tuple identifier 604, and one or more statement pairs 605, each statement pair 605 comprising a respective statement type 606 and database statement 607. In some embodiments, the header 602 contains other data. In an embodiment, the tuple 601 further contains a body portion 608 having a variable number of user data fields 609-611 as defined by the data streaming application. In the illustrated embodiment, the tuple 601 includes three user data fields 609-611. In an embodiment, the user data fields can include various amounts and types of data, which can vary widely and will be depend directly on the implementation. However, in some embodiments, the tuple 601 includes any number of user data fields. In an embodiment, the tuple type 603 is the name of a set of tuples having a common defined structure, corresponding roughly to a table name of a database table containing multiple tuples (also called records or rows).

In the illustrated embodiment, the statement pair 605 includes a statement type indicator 606 and a corresponding database statement 607. In an embodiment, the statement type indicator 606 provides an indicator to signal the inclusion of a database statement 607 in the tuple 601. In an embodiment, the statement type indicator 606 includes a standardized indication that is the same regardless of the database statement 607 and is suitable for signaling to a database that the tuple 601 includes a database statement 607. For example, in an embodiment, the statement type indicator 606 is a flag or the like that an application that creates the tuple can set to either of two different values, where one value indicates that a database statement 607 is present in the tuple 601, and another value indicates that a database statement 607 is not present in the tuple 601. In an embodiment, the statement type indicator 606 any of a predetermined list of values that indicate that a database statement 607 is present, and also provides information about the database statement 607, such as a type, class, or family of database statements that corresponds with the database statement 607, such as COMMAND indicating that the database statement 607 includes a database command, or HINT indicating that the database statement 607 includes an optimization hint.

In an embodiment, the statement 607 includes database statements, instructions, optimization hints, or other database commands that can be processed by a database, and can include, as non-limiting examples, instructions for creating, inserting, retrieving, selecting, querying, searching for, updating, or deleting data or data structures within a database, or in the case of optimization hints can include, as non-limiting examples, indications of modifications to an access plan. A database statement can be expressed, as non-limiting examples, in a data manipulation language (DML) or data description language (DDL), such as the structured query language (SQL).

In an embodiment, a non-limiting example of a database statement 607 includes "CREATE TABLE tbl (col_ID INT, col_1 VARCHAR(255))" for creating a new table named "tbl" having an integer (INT) column "col_ID" and a variable character (VARCHAR) column "col_1." In an embodiment, another non-limiting example of a database statement 607 includes "ALTER TABLE tbl ADD COLUMN (col_2 INT)" for adding an integer (INT) column "col_2" to table "tbl." In an embodiment, another non-limiting example of a database statement 607 includes "ALTER TABLE tbl MODIFY col_2 BIGINT" for changing the data type of column "col_2" to big integer (BIGINT). In an embodiment, another non-limiting example of a database statement 607 includes "ALTER TABLE tbl DROP COLUMN col_1" for deleting a column "col_1" from the table "tbl." In an embodiment, another non-limiting example of a database statement 607 includes "DROP TABLE tbl" for removing a table "tbl."

In an embodiment, the statement 607 includes a batch database statement including multiple database statements. In an embodiment, any routine that creates a new tuple copied from an existing tuple (parent tuple), the statement pair 605 of the parent tuple are copied into a statement pair 605 of the new tuple. In an embodiment, the statement pair 605 includes only a database statement 607 and omits the statement type indicator 606. In such embodiments, the database detects the presence of the database statement 607 in the tuple by detecting the database statement 607 rather than detecting the statement type indicator 606.

Figure 7:
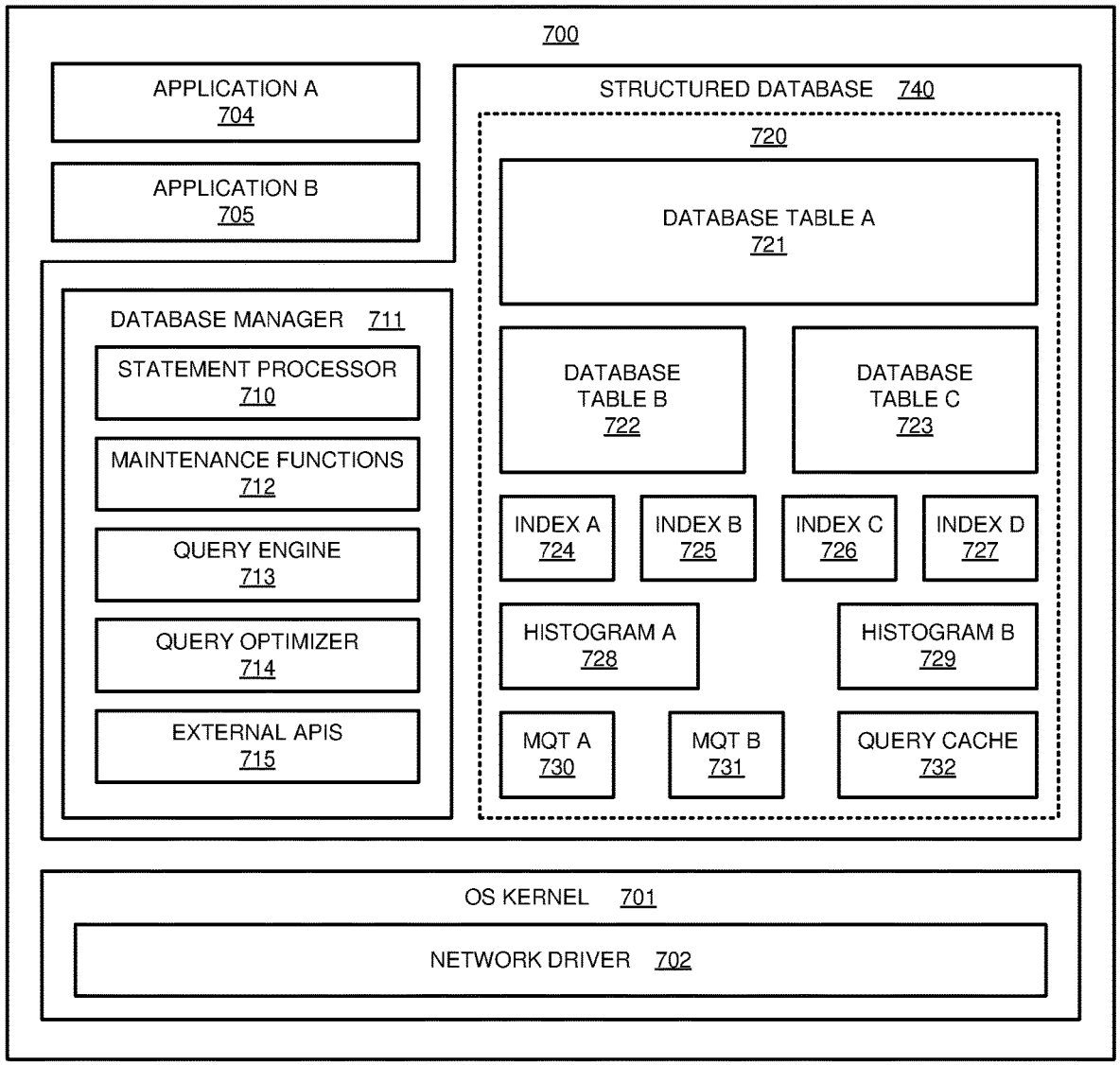
FIG. 7 depicts a block diagram of an example database system in accordance with an illustrative embodiment.

With reference to FIG. 7, this figure depicts a block diagram of an example database system 700 in accordance with an illustrative embodiment. In an embodiment, the database system 700 is an example of database system 315 of FIG. 3. In an embodiment, the block diagram of database system 700 is also an example of server 106 with database 109 of FIG. 1, and can include any of the elements shown in FIG. 2. For example, in an embodiment, the database system 700 is an example of server 106 with database 109 shown in FIG. 1 and the block diagram of database system 700 in FIG. 7 shows software components stored in one or more of main memory 208, ROM 224, hard disk drive or solid-state drive 226, and/or CD-ROM 230 shown in FIG. 2 and/or other similar local and/or remote computer usable storage devices.

In the illustrated embodiment, a database system 700 includes an operating system kernel 701 and structured database 740 including a database manager 711, one or more database tables 721-723, and one or more metadata structures 724-732. In an embodiment, operating system kernel 701 includes executable code and state data providing various low-level software functions, such as device interfaces, management of memory pages, management and dispatching of multiple tasks, and services for application programs. In an embodiment, operating system kernel 701 includes one or more network adapter drivers 702 for handling communications with one or more networks. In an embodiment, network adapter drivers 702 include instructions for communicating with network 320 shown in FIG. 3 via network adapter 212 shown in FIG. 2.

In the illustrated embodiment, database tables and metadata 720 include one or more tables 721-723. In an embodiment, database tables 721-723 include data structures logically in the form of tables having multiple records (also called entries or tuples), each record having at least one, and usually multiple, fields (also called attributes). In an embodiment, the "rows" of the table correspond to the records, and the "columns" correspond to the fields. In an embodiment, tables 721-723 are arranged in any suitable structure known in the database art. In an embodiment, database tables 721-723 contain any desired type of data which is useful to users of the database system 700. In an embodiment, one or more auxiliary data structures 724-732, also sometimes referred to as metadata, characterize the structure of the database and data therein, and are useful in various tasks involved in database management, such as executing queries against the database. In an embodiment, auxiliary data structures 724-732 include database indexes 724-727, histograms 728-729, materialized query tables (MQT) 730-731, and a query cache 732 in which data regarding previously executed queries is stored.

In the illustrated embodiment, a database manager 711 comprises executable computer programming code that provides basic functions for the management of the database 740. In the illustrated embodiment, the database manager 711 includes a statement processor module 710, a maintenance functions module 712, a query engine module 713, a query optimizer module 714, and an external APIs module 715.

In an embodiment, the statement processor module 710 monitors incoming data tuples and automatically detects the presence of statement type blocks in the incoming tuples, such as the statement pair 605 shown in FIG. 6 including a statement type indicator 606 and a database statement 607, or a database statement 607 without a statement type indicator 606. For example, in an embodiment, the statement processor module 710 detects the statement type indicator 606 as an indicator that signals the inclusion of a database statement 607 in the tuple 601. In an embodiment, the statement processor module 710 monitors incoming tuples for a standardized indication that signals to the statement processor module 710 that the tuple 601 includes a database statement 607.

For example, in an embodiment, the statement processor module 710 detects a flag or the like can be set to either of two different values, where one value indicates that a database statement 607 is present in the tuple 601, and another value indicates that a database statement 607 is not present in the tuple 601. In an embodiment, the statement processor module 710 detects any of a predetermined list of values that indicate that a database statement 607 is present, and also provides information about the database statement 607, such as a type, class, or family of database statements that corresponds with the database statement 607, such as COMMAND indicating that the database statement 607 includes a database command, or HINT indicating that the database statement 607 includes an optimization hint. In an embodiment, the statement pair 605 includes only a database statement 607 and omits the statement type indicator 606. In such embodiments, the statement processor module 710 detects the presence of the database statement 607 in the tuple by detecting the database statement 607 rather than detecting the statement type indicator 606.

In the illustrated embodiment, whenever the statement processor module 710 detects that the tuple includes a database statement, the statement processor module 710 extracts the database statement from the tuple. The statement processor module 710 then provides the database statement to the maintenance functions module 712 or to the query optimizer module 714 if the database statement includes an optimization hint. In an embodiment, if the statement processor module 710 detects a database statement in the tuple, the statement processor module 710 delays the transmission of the data fields to the database 740 until the maintenance functions module 712 and/or query optimizer module 714 has completed performing any tasks associated with the database statement. For example, a tuple may include a database statement to add a column to a table, and the data fields include data for the new column. Therefore, in order to prevent an error in the database due to receipt of data for a column that does not exist, the statement processor module 710 delays the transmission of the data until the new column has been added.

In the illustrated embodiment, the maintenance functions module 712 receives database statements from the statement processor module 710 and automatically performs functions on the database 740 in accordance with instructions conveyed by the database statement. In an embodiment, the maintenance functions module 712 performs certain functions to manage the database and/or allow authorized users to perform basic administrative operations with respect to the database, such as defining and editing database table definitions, creating, editing and removing records in the database, viewing records in the database, defining database auxiliary data structures such as indexes and materialized query tables and views. In an embodiment, the maintenance functions module 712 performs administrative functions that include logging of database transactions and recovery of data. In an embodiment, the maintenance functions module 712 makes certain of these functions available based on corresponding levels of authority, for example such functions can be initiated only by system administrators, while some other functions can also by initiated by system administrators and clients or users lacking administrative authority.

In the illustrated embodiment, the query engine module 713 executes queries against data in database tables 721-723 and a query optimizer module 714 generates optimized query execution plans for use by query engine module 713 in executing queries. In the illustrated embodiment, the external APIs module 715 has one or more application programming interfaces (APIs) by which external applications can access data in database 740 either by invoking query engine 713 or through other means. In an embodiment, the database manager 711 uses a structured query language (SQL) query protocol. In the illustrated embodiment, the database manager 711 is an entity separate from operating system kernel 701. In an alternative embodiment, the database manager 711 is integrated with the operating system kernel 701.

In the illustrated embodiment, the database 740 has three database tables 721-723 and nine auxiliary structures 724-732. In an embodiment, the database 740 more or fewer than three tables and/or more or fewer than nine auxiliary structures. In an embodiment, a computer system or a group of computer systems contains multiple databases, each database contains multiple tables, and each database has associated with it multiple indexes, MQTs, histograms, views, volatility records, and/or other auxiliary data structures not illustrated. In an embodiment, database 740 is logically part of a larger distributed database that is stored on multiple computer systems.

In the illustrated embodiment, the operating system 701 and database 740 of database system 700 includes all or selective portions of one or more user applications 704-705. In an embodiment, user applications 704-705 are applications that access data in database 740 to perform tasks on behalf of one or more users. In an embodiment, such user applications include, as non-limiting examples, sales transactions, inventory management, personnel records, accounting, code development and compilation, mail, calendaring, and/or any of thousands of user applications. In an embodiment, user applications 704-705 are web-based (i.e., present web pages to a remote client for rendering in the client's browser) or provide some other form of user interface. In an embodiment, user application 704 accesses data in the database 740 in a read-only manner, and user application 705 has the ability to update data in the database 740.

Figure 8:
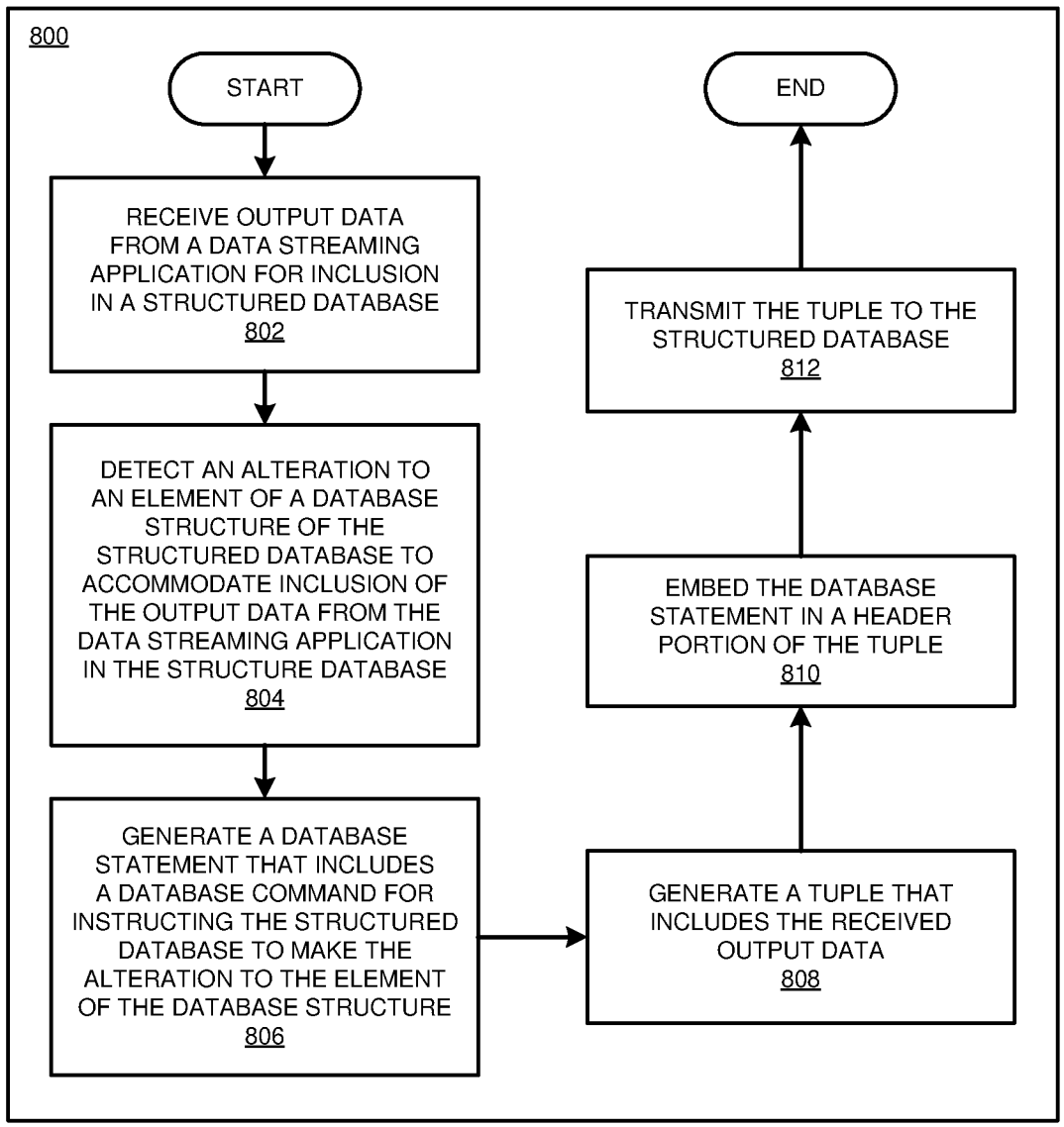
FIG. 8 depicts a flowchart of an example process 800 for streaming tuple database control in accordance with an illustrative embodiment.

With reference to FIG. 8 this figure depicts a flowchart of an example process 800 for streaming tuple database control. In a particular embodiment, a compute node, such as compute nodes 310A-310D of FIG. 3, 400 of FIG. 4, and 510A-510D of FIG. 5 carries out the process 800. In some such embodiments, a processing element of a compute node, such as a processing element 411 of FIG. 4 or PE1-PE10 of FIG. 5 carries out the process 800.

In an embodiment, the process 800 includes, at block 802, receiving output data from a data streaming application for inclusion in a structured database. Next, at block 804, the process detects an alteration to an element of a database structure of the structured database to accommodate inclusion of the output data from the data streaming application in the database. Next, at block 806, the process generates a database statement that includes a database command for instructing the structured database to make the alteration to the element of the database structure. Next, at block 808, the process generates a tuple that includes the received output data. Next, at block 810, the process embeds the database statement in a header portion of the tuple. Finally, at block 812, the process transmits the tuple to the structured database.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
   receiving, by a first compute node, data for transmission as streaming data on a network connected to the first compute node and a database;
   assembling, by the first compute node, a body portion of a tuple to include the data;
   assembling, by the first compute node, a header portion of the tuple to include a database statement that identifies a change to be made by the database to an aspect of the database in a format that is identifiable by the database, wherein the assembling of the header portion further comprises assembling the header portion to include an indicator that is configured to be recognizable by the database as an indication that the header includes the database statement; and
   transmitting, by the first compute node, the tuple having the header portion thereof and the body portion thereof on the network as streaming data with the header and body portions of the tuple being directed to the database.

2. The method of claim 1, wherein the database statement includes an alter statement that instructs the database to make an alteration to a table of the database to accommodate the data.

3. The method of claim 2, further comprising receiving an indication from a user interface to include the alter statement in the tuple.

4. The method of claim 2, further comprising receiving an indication from an application associated with the data to include the alter statement in the tuple.

5. The method of claim 1, wherein the database statement includes an optimization hint that instructs the database to make an alteration to an access plan.

6. The method of claim 5, further comprising receiving an indication from a user interface to include the optimization hint in the tuple.

7. The method of claim 5, further comprising receiving an indication from an application associated with the data to include the optimization hint in the tuple.

8. The method of claim 1, wherein the transmitting of the tuple includes transmitting the tuple to a second compute node en route to the database.

9. A computer usable program product comprising one or more computer readable storage media, and program instructions collectively stored on the one or more computer readable storage media, the program instructions executable by controller circuitry to cause the controller circuitry to perform operations comprising:
   receiving, by a first compute node, data for transmission as streaming data on a network connected to the first compute node and a database;
   assembling, by the first compute node, a body portion of a tuple to include the data;
   assembling, by the first compute node, a header portion of the tuple to include a database statement that identifies a change to be made by the database to an aspect of the database in a format that is identifiable by the database, wherein the assembling of the header portion further comprises assembling the header portion to include an indicator that is configured to be recognizable by the database as an indication that the header includes the database statement; and
   transmitting, by the first compute node, the tuple having the header portion thereof and the body portion thereof on the network as streaming data with the header and body portions of the tuple being directed to the database.

10. The computer usable program product of claim 9, wherein the database statement includes an alter statement that instructs the database to make an alteration to a table of the database to accommodate the data.

11. The computer usable program product of claim 10, further comprising receiving an indication from a user interface to include the alter statement in the tuple.

12. The computer usable program product of claim 9, wherein the database statement includes an optimization hint that instructs the database to make an alteration to an access plan.

13. The computer usable program product of claim 12, further comprising receiving an indication from a user interface to include the optimization hint in the tuple.

14. The computer usable program product of claim 9, wherein the stored program instructions are stored in a computer readable storage device in a data processing system, and wherein the stored program instructions are transferred over a network from a remote data processing system.

15. The computer usable program product of claim 9, wherein the stored program instructions are stored in a computer readable storage device in a server data processing system, and wherein the stored program instructions are downloaded over a network to a remote data processing system for use in a computer readable storage device associated with the remote data processing system, further comprising:
   program instructions to meter use of the computer usable program product associated with a request; and
   program instructions to generate an invoice based on the metered use.

16. A computer system comprising a processor and one or more computer readable storage media, and program instructions collectively stored on the one or more computer readable storage media, the program instructions executable by the processor to cause the processor to perform operations comprising:

receiving, by a first compute node, data for transmission as streaming data on a network connected to the first compute node and a database;

assembling, by the first compute node, a body portion of a tuple to include the data;

assembling, by the first compute node, a header portion of the tuple to include a database statement that identifies a change to be made by the database to an aspect of the database in a format that is identifiable by the database, wherein the assembling of the header portion further comprises assembling the header portion to include an indicator that is configured to be recognizable by the database as an indication that the header includes the database statement; and transmitting, by the first compute node, the tuple having the header portion thereof and the body portion thereof on the network as streaming data with the header and body portions of the tuple being directed to the database.

17. The computer system of claim 16, wherein the database statement includes an alter statement that instructs the database to make an alteration to a table of the database to accommodate the data.

18. The computer system of claim 17, further comprising receiving an indication from a user interface to include the alter statement in the tuple.

19. The computer system of claim 16, wherein the database statement includes an optimization hint that instructs the database to make an alteration to an access plan.

* * * * *